United States Patent [19]
Takemoto et al.

[11] Patent Number: 4,727,001
[45] Date of Patent: Feb. 23, 1988

[54] ALUMINUM BRAZING SHEET

[75] Inventors: Masao Takemoto; Jun Takigawa; Tomohiro Nishimura; Kikuo Toyose, all of Moka, Japan

[73] Assignee: Kabushiki Kaisha Kobe Seiko Sho, Kobe, Japan

[21] Appl. No.: 914,141

[22] Filed: Oct. 1, 1986

[30] Foreign Application Priority Data

Oct. 1, 1985 [JP] Japan ................................ 60-218886

[51] Int. Cl.$^4$ .............................................. B32B 15/20
[52] U.S. Cl. .................................. 428/654; 228/263.17; 420/533
[58] Field of Search ................ 428/654; 420/533, 535; 228/263.17; 165/180, 905

[56] References Cited

U.S. PATENT DOCUMENTS

| 3,843,333 | 10/1974 | Woods | 428/654 |
| 4,211,827 | 7/1980 | Pryor et al. | 428/654 |
| 4,560,625 | 12/1985 | Kaifu et al. | 165/180 |

FOREIGN PATENT DOCUMENTS

| 44742 | 4/1981 | Japan | 428/654 |
| 83741 | 5/1984 | Japan | 428/654 |
| 93194 | 5/1984 | Japan | 165/905 |
| 100250 | 6/1984 | Japan | 428/654 |

Primary Examiner—L. Dewayne Rutledge
Assistant Examiner—Robert L. McDowell
Attorney, Agent, or Firm—Oblon, Fisher, Spivak, McClelland & Maier

[57] ABSTRACT

An aluminum brazing sheet for use in brazing comprises;
a core material composed of an aluminum alloy containing:
  0.2–1.0 wt % Cu,
  0.2–0.8 wt % Mg and
at least one of the elements selected from:
  0.05–0.5 wt % Mn,
  0.05–0.5 wt % Zr,
  0.05–0.5 wt % Cr, and
  the balance of Al and impurities, and
a filler material composed of an Al-Si based alloy brazing material coated on one surface of said core material and a skin material composed of a sacrificial aluminum anode material at a purity higher than 99.0 wt % coated on the other surface of the core material. The aluminum brazing sheet according to this invention is satisfactory in the brazing property and also excellent in the corrosion resistance and the strength, which is suitable as the material for use in aluminum heat exchangers.

2 Claims, No Drawings

ALUMINUM BRAZING SHEET

BACKGROUND OF THE INVENTION

1. Field of the Invention

This invention concerns an aluminum brazing sheet for use in brazing and, more specifically, it relates to an aluminum brazing sheet for use in brazing used for forming coolant channels in automobile heat exchangers.

2. Description of the Prior Art

Brazing sheets for use in vacuum brazing are defined in JIS Z3262, and cladding materials composed of core 3003 and filler 4004 or cladding material composed of core 6951 and filler 4004 have hitherto been used.

Although these cladding materials have relatively satisfactory brazing property, they are still insufficient in view of corrosion resistance and strength for use in automobile heat exchangers used under severe circumstances, for example, in radiators or air conditioners.

As countermeasures, various proposals have been made, for example, as described in Japanese Patent Publication No. 35589/1983, but no quite satisfactory materials have not yet been available at present.

SUMMARY OF THE INVENTION

The object of this invention is to overcome the forming problems in the brazing sheets for use in brazing in the prior art and provide an aluminum brazing sheet for use in brazing which is satisfactory in the brazing property and excellent in the corrosion resistance and the strength as well.

The foregoing object can be attained in accordance with this invention by an aluminum brazing sheet for use in brazing comprising:

a core material composed of an aluminum alloy containing
 0.2–1.0 wt % Cu,
 0.2–0.8 wt % Mg,
at least one of the elements selected from:
 0.05–0.5 wt % Mn,
 0.05–0.5 wt % Zr, and
 0.05–0.5 wt % Cr,
and the balance of Al and impurities and
a filler material composed of an Al-Si based alloy brazing material which is coated on one or both sides of the core material, as well as by an aluminum brazing sheet for use in brazing comprising:

a core material composed of an aluminum alloy containing
 0.2–1.0 wt % Cu,
 0.2–0.8 wt % Mg, and
at least one of elements selected from
 0.05–0.5 wt % Mn,
 0.05–0.5 wt % Zr,
 0.05–0.5 wt % Cr, and
 the balance of Al and impurities,
a filler material composed of an Al-Si alloy brazing material coated on one surface of the core material and a skin material composed of a sacrificial aluminum anode material a purity of higher than 99.0 wt % coated on the other surface of the core material.

The aluminum brazing sheet for use in brazing according to this invention will now be described specifically.

Explanation will at first be made to the core material and skin material in the aluminum brazing sheet for use in brazing according to this invention.

(1) Core material

Cu is an element for improving the strength and the electrical potential. Although Cu is considered to reduce the corrosion resistance, reduction in the corrosion resistance due to the incorporation of Cu is eliminated and the strength and the potential can be improved by the heating process at 570°–620° C. necessarily applied in the brazing process and due to the incorporation of at least one of Mn, Cr and Zr. If the Cu content is less than 0.2 wt %, no substantial improvement for the potential can be expected, electrochemical corrosion (galvanic corrosion) between Al-Si alloy brazing material which is noble in view of the electrical potential and the core material can not be prevented and, further, less improving effect can be attained for the strength. While on the other hand, if the Cu content is in excess of 1.0 wt %, the corrosion resistance is degraded. Accordingly, the Cu content is defined as from 0.2 to 1.0 wt %.

Mg is an element attributable to the improvement in the strength of the core material after brazing. If the content is less than 0.2 wt %, no substantial effect can be attained and, while on the other hand, if it exceeds 0.8 wt %, erosion of the Al-Si brazing material becomes remarkable to reduce the corrosion resistance and, further, brazing property is impaired. Accordingly, the Mg content is defined as from 0.2 to 0.8 wt %.

Zr forms inter-metallic compounds with Al (Al$_3$Zr) thereby enhancing the sub-grains by being finely distributed in the core material and suppresses recrystallization. Accordingly, metal texture is made fiberous by rolling or extruding fabrication, flat crystal grains are formed after the heating by the brazing, grain boundary diffusion of Si in the brazing material into the core material is reduced during brazing and the corrosion resistance is improved as a result of the reduction in the grain boundary corrosion sensitivity. If the Zr content is less than 0.05 wt %, no such effect can be attained sufficiently. If the Zr content is in excess of 0.5 wt %, the effect is saturated and the workability is reduced due to the formation of large intermetallic compound. Accordingly, the Zr content is defined as from 0.05 to 0.5 wt %.

Mn is an element enhancing the subgrains like Zr and the improving the workability. If the Mn content is less than 0.05 wt %, no substantial effect can be attained. While on the other hand, if it exceeds 0.5 wt %, the grain boundary corrosion sensitivity tends to be increased. Accordingly, the Mn content is defined as from 0.05 to 0.5 wt %.

Cr is an element of enhancing the subgrains like Zr and improving the workability. If the Cr content is less than 0.05 wt %, no sufficient effect can be obtained. On the other hand, if it exceeds 0.5 wt %, the effect is saturated and the workability is degraded due to the formation of large intermetallic compound. Accordingly, the Cr content is defined as from 0.05 to 0.5 wt %.

In addition to the ingredients as has been described above, Ti can be contained by a trace amount for improving the casting property. Further, Si content of less than 0.2 wt % and Fe content of less than 0.7 wt % may be incorporated as impurities.

(2) Brazing material as the filler material

Al-Si alloy is used as the brazing material and a typical brazing material comprises an aluminum alloy containing 7-14 wt % Si and the substantial balance of Al, which has a lower melting point than that of the material to be brazed and flowability during brazing. The Si content is defined as 7-14 wt % considering the corrosion resistance, the strength and the workability at the brazed portion.

In the case of using the core material as the vacuum brazing sheet, it is preferred to incorporate from 0.5 to 2 wt % Mg in addition to Si as described above. Mg functions as a getter in the vacuum brazing to consume $H_2O$, $O_2$, etc. in the vacuum furnace and further destroys the oxide membranes at the surface thereby enabling brazing. If the Mg content is less than 0.5 wt %, no sufficient effect can be obtained. While on the other hand, if it exceeds 2.0 wt %, the effect is saturated and, rather, it results in a disadvantage of contaminating the furnace or the like. In addition to Si and Mg, Bi may also be incorporated by an appropriate amount. In the case of using the brazing sheet as the fin members of heat exchangers, the brazing material is coated as the filler material on both sides of the core material.

The cladding rate of the brazing material (thickness of the brazing material to the entire plate thickness) is preferably from 5 to 20 %.

(3) Sacrificial anode material as the skin material

The sacrificial anode material is coated as the skin on one side of the core material. It is necessary that aluminum material less noble in view of the electrical potential than the core material is used as the sacrificial anode material, and those aluminum alloys containing a relatively great amount of Zn such as 7072 alloy are usually used. Since the core material contains Cu as the essential ingredient that renders the potential noble, no additional incorporation of Zn readily evaporizable at the brazing is necessary and those aluminum alloys containing more than 99.0 wt % Al and less than 0.2 wt % Cu may be used.

The cladding rate of the sacrificial anode material is suitably from 5 to 15%. If it is less than 5%, no substantial effect as the sacrificial anode can be obtained. While on the other hand, if it exceeds 15%, the strength as the brazing sheet is reduced and the strength after heating upon brazing is lowered as well.

Explanation will then be made for the aluminum brazing sheet for use in brazing according to this invention referring to examples.

EXAMPLE

The core material, brazing material and sacrificial anode material having the ingredients and the ratio of the ingredients as shown in Table 1 were prepared respectively by melting, casting and fabrication into final plate thickness of 0.35 mm in ordinary procedures.

The specimens Nos. 1, 3, 4-12, 14-16 were heated to and maintained at a temperature of 595-600° C. at $2 \times 10^{-4}$ Torr of vacuum degree for 2 minutes, followed by cooling and then served for the test.

Potassium fluoride type non-corrosive fluxes were used for the specimens Nos. 2, 13 and 17 and the specimens were heated to and maintained at a temperature of 595°-600° C. under an atmospheric temperature, followed by cooling and then served to the test.

The results of the test are shown in Table 2.

Test Method

Strength

JIS No. 5 test specimen (JIS Z2201) was cut out from the brazed specimen under heating and measured by the tensile test.

Corrosion Resistance Test

The test was carried out for the surface of the brazing material according to ASTM-B287 using 5% NaCl corrosion solution adjusted to pH 3 by $CH_3COOH$ and at a temperature of 49±2° C.

The Time until the Corrosion Proceeds to Perforate the Plate more than 150 hr: o
75-150 hr: Δ
less than 75 hr: x The cyclic test was carried out for the surface of the sacrificial anode, by immersing the test specimen in a corrosion promoting liquid ($Cl^-$ 100 ppm, $SO_4^{2-}$ 300 mm, $HCO_3^-$ 200 mm, $Cu^{2+}$ 1 ppm) while sealing the opposite surface with an adhesive tape at 88° C.×8 hr and at room temperature×16 hr. Further, air was blown at 100 ml/min into the corrosion promoting liquid. In the case where the sacrificial anode material was not coated, the core material was directly exposed to the corrosion promoting liquid.

Corrosion Depth in the 40 Cycle Test less than 0.15 mm: o
0.15-0.25 mm: Δ
more than 0.25 mm: x From the Table 2, it can be seen that the aluminum brazing sheet for use in brazing according to this invention is extremely excellent in the corrosion resistance and the strength.

TABLE 1

| | No. | Chemical ingredient of the core material (wt %) | | | | | | | | Brazing material (cladding rate) | Sacrifice anode material (cladding rate) | Remark |
| --- | --- | --- | --- | --- | --- | --- | --- | --- | --- | --- | --- | --- |
| | | Si | Fe | Cu | Mn | Mg | Zr | Cr | Ti | | | |
| Material of the prior art | 1 | 0.15 | 0.45 | 0.15 | 1.0 | — | — | — | 0.02 | 4004 one (10% side) | — | core material 3003 |
| Material of the prior art | 2 | 0.15 | 0.43 | — | 1.2 | 0.40 | — | — | 0.02 | 4045 one (10% side) | — | core material 3005 |
| Material of the prior art | 3 | 0.35 | 0.40 | 0.15 | — | 0.60 | — | — | 0.02 | 4004 one (10% side) | — | core material 6951 |
| Material of the prior art | 4 | 0.15 | 0.45 | 0.15 | 1.0 | — | — | — | 0.02 | 4004 one (10% side) | 7072 (10%) | core material 3003 |
| Material of the invention | 5 | 0.15 | 0.45 | 0.51 | 0.30 | 0.50 | 0.13 | 0.15 | 0.02 | 4004 one (10% side) | 99.7 wt % Al (10%) | — |
| Material | 6 | 0.15 | 0.45 | 0.51 | 0.30 | 0.21 | 0.13 | 0.15 | 0.02 | 4004 | 99.5 wt % Al | — |

TABLE 1-continued

| | No. | Chemical ingredient of the core material (wt %) | | | | | | | | Brazing material (cladding rate) | Sacrifice anode material (cladding rate) | Remark |
|---|---|---|---|---|---|---|---|---|---|---|---|---|
| | | Si | Fe | Cu | Mn | Mg | Zr | Cr | Ti | | | |
| of the invention | | | | | | | | | | one (10% side) | (10%) | |
| Material of the invention | 7 | 0.15 | 0.45 | 0.50 | 0.30 | 0.80 | 0.13 | 0.15 | 0.02 | 4004 one (10% side) | 99.5 wt % Al (10%) | — |
| Material of the invention | 8 | 0.15 | 0.43 | 0.30 | 0.30 | 0.40 | — | 0.15 | 0.02 | 4004 one (10% side) | 99.7 wt % Al (10%) | — |
| Material of the invention | 9 | 0.15 | 0.43 | 0.51 | 0.30 | 0.40 | — | — | 0.02 | 4004 one (10% side) | 99.7 wt % Al (10%) | — |
| Material of the invention | 10 | 0.15 | 0.45 | 0.65 | — | 0.21 | 0.13 | — | — | 4004 one (10% side) | 99.7 wt % Al (10%) | — |
| Material of the invention | 11 | 0.15 | 0.45 | 0.51 | 0.30 | 0.50 | 0.13 | 0.15 | 0.02 | 4004 one (10% side) | 99.7 wt % Al (7%) | — |
| Material of the invention | 12 | 0.15 | 0.45 | 0.51 | 0.30 | 0.50 | 0.13 | 0.15 | 0.02 | 4004 one (10% side) | — | — |
| Material of the invention | 13 | 0.15 | 0.45 | 0.51 | 0.30 | 0.50 | 0.13 | 0.15 | 0.02 | 4045 one (10% side) | 99.7 wt % Al (10%) | — |
| Comparative material | 14 | 0.15 | 0.45 | 0.51 | 0.30 | — | 0.13 | 0.15 | 0.02 | 4004 one (10% side) | 99.7 wt % Al (10%) | — |
| Comparative material | 15 | 0.15 | 0.45 | 0.51 | 0.30 | 1.1 | 0.13 | 0.15 | 0.02 | 4004 one (10% side) | 99.7 wt % Al (10%) | — |
| Comparative material | 16 | 0.15 | 0.45 | 1.2 | 0.30 | 0.40 | 0.13 | 0.15 | 0.02 | 4004 one (10% side) | 99.7 wt % Al (10%) | — |
| Comparative material | 17 | 0.15 | 0.45 | 0.51 | 0.30 | — | 0.13 | 0.15 | j0.02 | 4045 one (10% side) | 99.7 wt % Al (10%) | — |

TABLE 2

| | Test Results | | |
|---|---|---|---|
| No. | Corrosion resistance on the brazing material surface | Corrosion resistance on the sacrificial anode material surface | Tensile strength after brazing (kgf/mm$^2$) |
| Material of the prior art | | | |
| 1 | x | x | 12.5 |
| 2 | x | x | 14.8 |
| 3 | x | x | 17.5 |
| 4 | x | Δ | 12.0 |
| 5 | o | o | 16.1 |
| 6 | o | o | 14.9 |
| Material of the invention | | | |
| 7 | o | o | 17.9 |
| 8 | o | o | 15.3 |
| 9 | o | o | 16.0 |
| 10 | o | o | 16.2 |
| 11 | o | o | 16.3 |
| 12 | o | — | 16.5 |
| 13 | o | o | 16.2 |
| Comparative material | | | |
| 14 | o | o | 13.9 |
| 15 | Δ | — | 19.8 |
| 16 | x | — | 20.5 |
| 17 | o | o | 14.2 |

As has been described above, the aluminum brazing sheet for use in brazing according to this invention having the foregoing constitution is excellent both in the corrosion resistance and the strength after the brazing and is suitable as the material for use in heat exchangers made of aluminum.

What is claimed is:

1. An aluminum brazing sheet for use in brazing comprising;
   a core material composed of an aluminum alloy consisting of:
     0.2–1.0 wt % Cu,
     0.2–0.8 wt % Mg and
     at least one of the elements selected from:
     0.05–0.5 wt % Mn, 0.05–0.5 wt % Zr,
0.05–0.5 wt % Cr, and
the balance of Al and impurities, and
a filler material composed of an Al-Si based alloy brazing material, which is coated on one or both surfaces of said core material.

2. An aluminum brazing sheet for use in brazing comprising;
a core material composed of an aluminum alloy consisting of:
0.2–1.0 wt. % Cu,
0.2–0.8 wt. % Mg and
at least one of the elements selected from:
0.05–0.5 wt. % Mn,
0.05–0.5 wt. % Zr,
0.05–0.5 wt. % Cr, and
the balance of Al and impurities, and
a filler material composed of an Al-Si based alloy brazing material, in which
said Al-Si based alloy brazing material is coated as the filler material on one surface of said core material and a sacrificial aluminum anode material consisting essentially of aluminum of a purity higher than 99.0 wt. % is coated as the skin material on the other surface of said core material respectively.

* * * * *